United States Patent [19]

Gäng

[11] Patent Number: 4,746,184
[45] Date of Patent: May 24, 1988

[54] LIGHT COUPLER FOR OPTICAL REFLECTOMETRY

[75] Inventor: Ing. A. Gäng, Stuttgart, Fed. Rep. of Germany

[73] Assignee: Hewlett-Packard Company, Palo Alto, Calif.

[21] Appl. No.: 883,886

[22] Filed: Jul. 9, 1986

[30] Foreign Application Priority Data

Jul. 10, 1985 [EP] European Pat. Off. ........ 85108585.2

[51] Int. Cl.⁴ .................. G02B 6/26; G01N 21/00
[52] U.S. Cl. .................. 350/96.15; 350/96.19; 356/73.1
[58] Field of Search ............. 350/96.15, 96.16, 96.18, 350/96.20, 96.19, 401, 402, 73.1, 445, 448

[56] References Cited

U.S. PATENT DOCUMENTS 4,199,226  4/1980  Weber et al. ..................... 350/401
4,212,537  7/1980  Golob et al. ..................... 356/73.1

FOREIGN PATENT DOCUMENTS 3035025  4/1981  Fed. Rep. of Germany .
1236974  6/1960  France .
2537280  6/1984  France ............................ 356/73.1

OTHER PUBLICATIONS

"Electronics Letters" vol. 18, No. 20.
"Electronics Letters" vol. 17, No. 5.

Primary Examiner—John Lee
Assistant Examiner—John Ngo
Attorney, Agent, or Firm—John A. Frazzini

[57] ABSTRACT

A light coupler for use in optical reflectometry on both single mode and multimode optical fibers. The single mode embodiment contains a polarized beam splitter, a depolarizer and a socket to hold an optical fiber. The beam splitter is oriented to transmit substantially all of the light in an incident beam of light, through the depolarizer to the optical fiber. Reflections from the optical fiber pass through the depolarizer to the beam splitter where 50% of the light is directed to a measuring output.

9 Claims, 1 Drawing Sheet

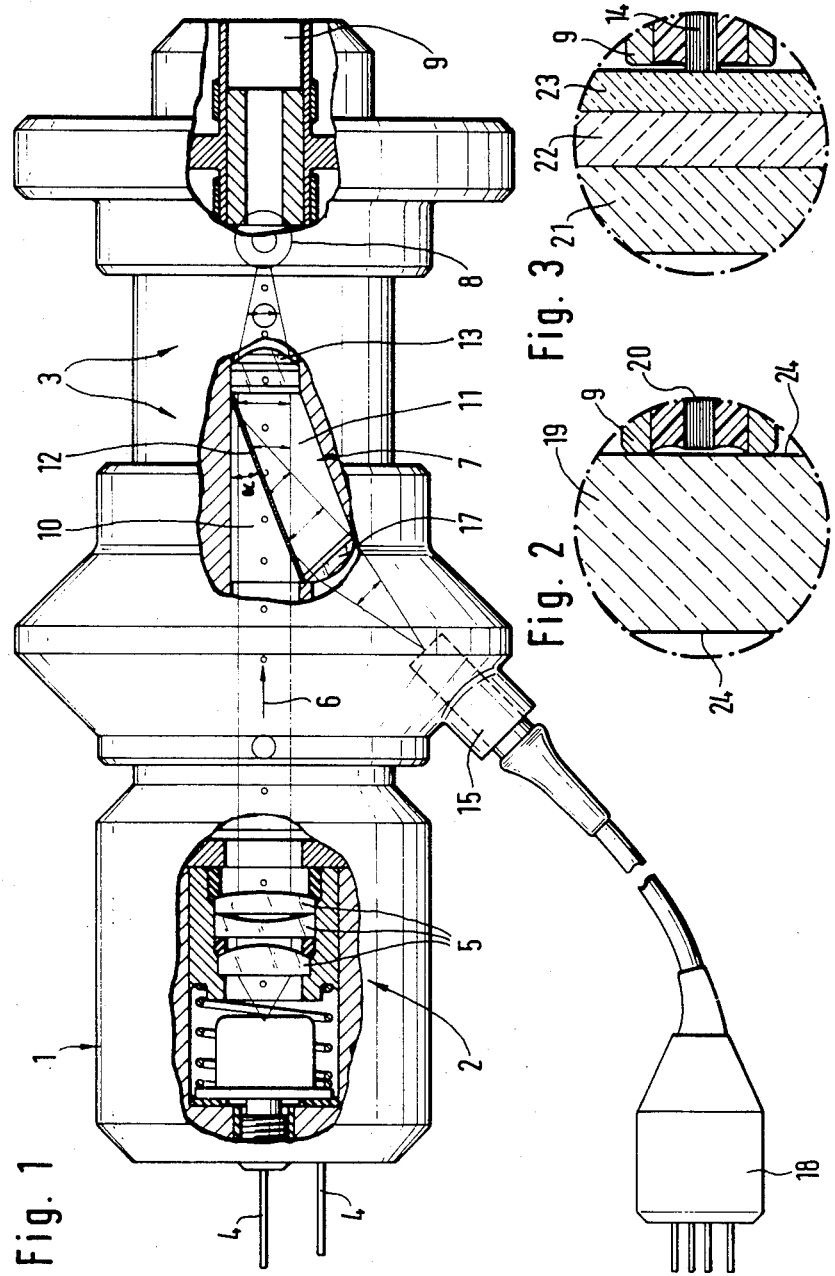

LIGHT COUPLER FOR OPTICAL REFLECTOMETRY

BACKGROUND OF THE INVENTION

The disclosed invention relates in general to a light coupler and relates more particularly to a light coupler for use in optical reflectometry on a monomode glass fiber. In optical reflectometry, a light beam is injected into one end of an optical fiber and then reflections of the light back to that end of the fiber are used to locate the spatial locations of cuts, fractures or other faults in the optical fiber. Typically, the light is injected from a pulsed laser and the light reflected back by the fiber faults coupled out to a measuring output by a beam splitter contained in the coupler. A measuring instrument is coupled to the output to measure the intensity of reflected light as a function of time.

The design of the coupler depends largely on whether a single mode fiber or a multimode fiber is being tested. Single mode fibers typically have a diameter on the order of the wavelength of light (9-12 microns diameter) so that only one specific mode of light can propagate along the fiber. Multimode fibers are typically thicker (50-120 microns diameter) than single mode fibers so that many modes can propagate down the fiber. Multimode fibers typically exhibit a larger attenuation than single mode fibers.

In a multimode fiber, if a linearly polarized light beam is injected into the fiber, the difference in propagation velocity of the different modes results in a depolarization of the light beam within about ten centimeters of the end of the injection end of the fiber. In contrast to this, in a single mode fiber the linear polarization is retained over large distances on the order of a couple kilometers. In addition, the light reflected back to the injection end of the fiber is also linearly polarized. However, thermal and mechanical stresses in a single mode fiber can rotate the direction of polarization of the light. If a polarized beam splitter is used to couple the light out of the fiber, then such rotations can lead to spurious effects on the amount of reflected light coupled out of the fiber. Therefore, a nonpolarized beam splitter is used to couple light into and out of the fiber so that the amount of light coupled out is substantially independent of the polarization of the reflected light. Such a nonpolarized beam splitter can be produced from semi-transparent mirrors or fiber optic beam splitters that have a splitting ratio that is substantially independent of the polarization of the reflected light. Unfortunately, such a coupler also reduces by 50% the amount of light coupled into the fiber and then further reduces by 50% the amount of light coupled out of the fiber to the measuring device.

SUMMARY OF THE INVENTION

In accordance with the illustrated preferred embodiment, a coupler is presented that increases the amount of light coupled into the fiber from a source of a polarized, collimated beam of light. At the input of the coupler is a polarized beam splitter that is oriented to transmit nearly 100% of a polarized beam of light from a polarized light source, such as a laser. The coupler includes a depolarizer that depolarizes the light before it is injected into the end of the optical fiber. The light reflected from within the optical fiber also passes through the depolarizer on its way back to the polarized beam splitter. The beam splitter deflects half of the light to a measuring device to measure the amplitude of the reflected light as a function of time.

The use of the polarized beam splitter doubles the amount of light coupled into the fiber. The depolarizer distributes the intensity of light uniformly over all directions of polarization. This has three benefits. First, this reduces nonlinear effects that would otherwise arise when high power densities of light are injected into the optical fiber in a single direction of polarization. This enables a greater amount of power to be injected into the fiber without exhibiting significant effects from such nonlinearities. Second, the amount of light coupled out of the fiber is independent of polarization so that spurious variations in the amount of light coupled out to the detector are avoided which might otherwise arise due to uncontrolled rotation of polarized reflections. This also enables fiber lengths on the order of kilometers to be tested without introducing such spurious effects on the measured output. The measuring device includes a detector, such as a photodiode, having a sensitivity that is independent of polarization. Third, by injecting depolarized light into the fiber, it is possible to detect defects in which the amount of reflection is dependent on the direction of polarization of the injected light.

Suitable choices of the beam splitter and the depolarizer are a Foster prism and a Lyot depolarizer. Preferably, the depolarizer is arranged in the coupler in such a manner that the optical fiber can be brought into physical contact with it. The surface of the depolarizer that is to be in contact with the fiber has a quartz glass coating to avoid reflections at the end of a quartz optical fiber. This quartz layer also protects the relatively soft components of the depolarizer.

A lens can also be included in the depolarizer at the point at which the optical fiber is to make contact. Alternatively, lenses can be located on the polarizer on the side facing the depolarizer as well as on the side facing the measuring output. Preferably, the depolarizer is configured so that it can be easily replaced with a glass disk when the coupler is used to test multimode optical fibers. When the glass disc is used, the polarized beam splitter acts to suppress reflection from the end of the optical fiber.

DESCRIPTION OF THE FIGURES

FIG. 1 shows an optical coupler for coupling light into a both single mode and multimode fibers.

FIG. 2 shows in greater detail a cross section of a depolarizer suitable for use in the coupler of FIG. 1 for testing multimode fibers.

FIG. 3 shows in greater detail a cross section of a depolarizer suitable for use in the coupler of FIG. 1 for testing single mode fibers.

DESCRIPTION OF THE PREFERRED EMBODIMENT

In FIG. 1 is shown an optical section of an optical reflectometer utilizing an improved coupler. A pulsed laser 1 and a collimator 2 cooperatively function as a source of a polarized collimated light beam 6. Pulsed laser 1 is a conventional semiconductor laser having electrical connections 4 that project from the rear face of the laser. The light emitted by laser 1 is collimated by collimator 2 which consists of a set 5 of four lenses.

The axial direction of the light beam is indicated by arrow 6. Beam 6 passes through a polarized optical beam splitter 7 and is focussed through a depolarizer 21-23 (see FIG. 3) located in a region 8 located directly in front of a connection socket 9 into which an optical fiber is to be inserted for testing of the optical fiber.

In this embodiment, the beam splitter is a Foster prism which contains two calcite layers 10 and 11 that are cemented together at a common interface 12. Interface 12 is inclined at an angle alpha equal to 22.5 degrees relative to the axial direction of beam 6. The direction of polarization of beam 6 is selected so that substantially all of the beam is transmitted across interface 12. Up to 99.5 % of beam 6 can be coupled through this beam splitter into depolarizer 21-23. A first aspherical lens 13 focusses the beam through a depolarizer 21-23 into an optical fiber 14 (see FIG. 3) inserted into socket 9.

Light scattered back by fiber 14 passes through depolarizer 21-23 in a direction opposite to arrow 6. This reflected light passes back to beam splitter 7 where 50% of the light is deflected at interface 12 into a measuring output 15. A second aspherical lens 17, located on the side of beam splitter facing measuring output 15, focusses the light passing through the measuring output to a detector such as photodiode 18. In order to prevent electric crosstalk between pulsed laser 1 and photodiode 18, an optical fiber is used to couple photodiode 18 to measuring output 15.

FIG. 2 shows an enlarged cross-section of the region 8 of the coupler that is adapted to contain depolarizer 21-23. In this embodiment, depolarizer 21-23 has been replaced by an unpolarized light conductor such as glass plate 19. On both ends of plate 19 are coating 24 that are selected to reduce reflections. This embodiment is particularly suitable for use in testing multimode optical fibers such as fiber 20. Because both single mode and multimode fibers are tested, the coupler is configured to allow easy manual or automated exchange of depolarizer 21-23 with glass plate 19. Such a design is well known in optical technology.

In this embodiment, polarized beam splitter 7 suppresses the reflections from the end face of optical fiber 20 into which beam 6 is injected. This light reflected from the end face of fiber 20 has the same polarization as the beam from laser 1 so that it is substantially completely transmitted across interface 12 so that substantially none of this reflected light reaches measuring output 15. This is advantageous because such reflection significantly interferes with the measurement over the first hundred meters of optical fiber 20 because of the limited bandwidth of the electronics used to measure the light passing through measuring output 15.

The coupler in FIG. 3 contains a depolarizer 21-23 and is designed for use in testing single mode optical fibers. Depolarizer 21-23 is a Lyot depolarizer and consists of two calcite layers 21 and 22 having principal axes that form an angle of 45 degrees with one another. Layer 21 is twice as thick as layer 22. As a result of the spectral distribution of pulsed beam 6, layers 21 and 22 act to depolarize the beam 6. A quartz layer 23 is provided on the side of layer 22 facing glass fiber 14. This layer permits reflection-free coupling of light from depolarizer 21-23 into a quartz optical fiber 14. This layer also provides mechanical protection for calcite layer 22 which is relatively soft compared to quartz layer 23. In plug connectors for single mode optical fibers, the optical fiber typically ends in a flat surface perpendicular to the axis of the fiber and extends a few microns past the end of the plug connector so that the end of the optical fiber can be pressed flat against layer 23. In contrast to this, multimode fibers usually terminate behind the front face of the connector body and exhibit a slightly inclined surface as illustrated in FIG. 2.

I claim:

1. A light coupler, suitable for coupling a light beam travelling along an incident direction from a source of light into an optical fiber, said coupler comprising:
   a polarized beam splitter oriented to receive an incident beam of light and transmit a portion of this light;
   means for depolarizing the light transmitted through the beam splitter; and
   means for holding an optical fiber at a point that receives the light transmitted through the beam splitter and the depolarizer and for directing that portion of the light reflected from within the optical fiber back to the polarized beam splitter.

2. A coupler as in claim 1 wherein the beam splitter is a Foster prism.

3. A coupler as in claim 2 wherein the beam splitter comprises:
   a pair of calcite layers, each layer having a flat surface facing the other calcite layer and oriented at 22.5 degrees to the incident direction of the light beam.

4. A coupler as in lcaim 1 wherein the means for depolarizing is a Lyot depolarizer.

5. A coupler as in claim 4 further comprising means for bringing an injection end of the optical fiber into contact with the Lyot depolarizer.

6. A coupler as in claim 5 wherein the depolarizer further comprises a quartz layer located at a point at which the optical fiber is to make contact with the depolarizer.

7. A coupler as in claim 1 further comprising a lens located between the beam splitter and the depolarizer and a lens between the beam splitter and a measuring output.

8. A coupler as in claim 1 wherein the depolarizer is connected directly to the beam splitter and further comprising a lens between the depolarizer and the means for holding the optical fiber.

9. A coupler as in claim 1 further comprising means for replacing the depolarizer with a nonpolarized light transmitting element.

* * * * *